Feb. 19, 1924.
N. P. SHULIN
1,484,575
DISCHARGE MEMBER FOR USE IN IRRIGATING SYSTEMS
Filed April 29, 1922
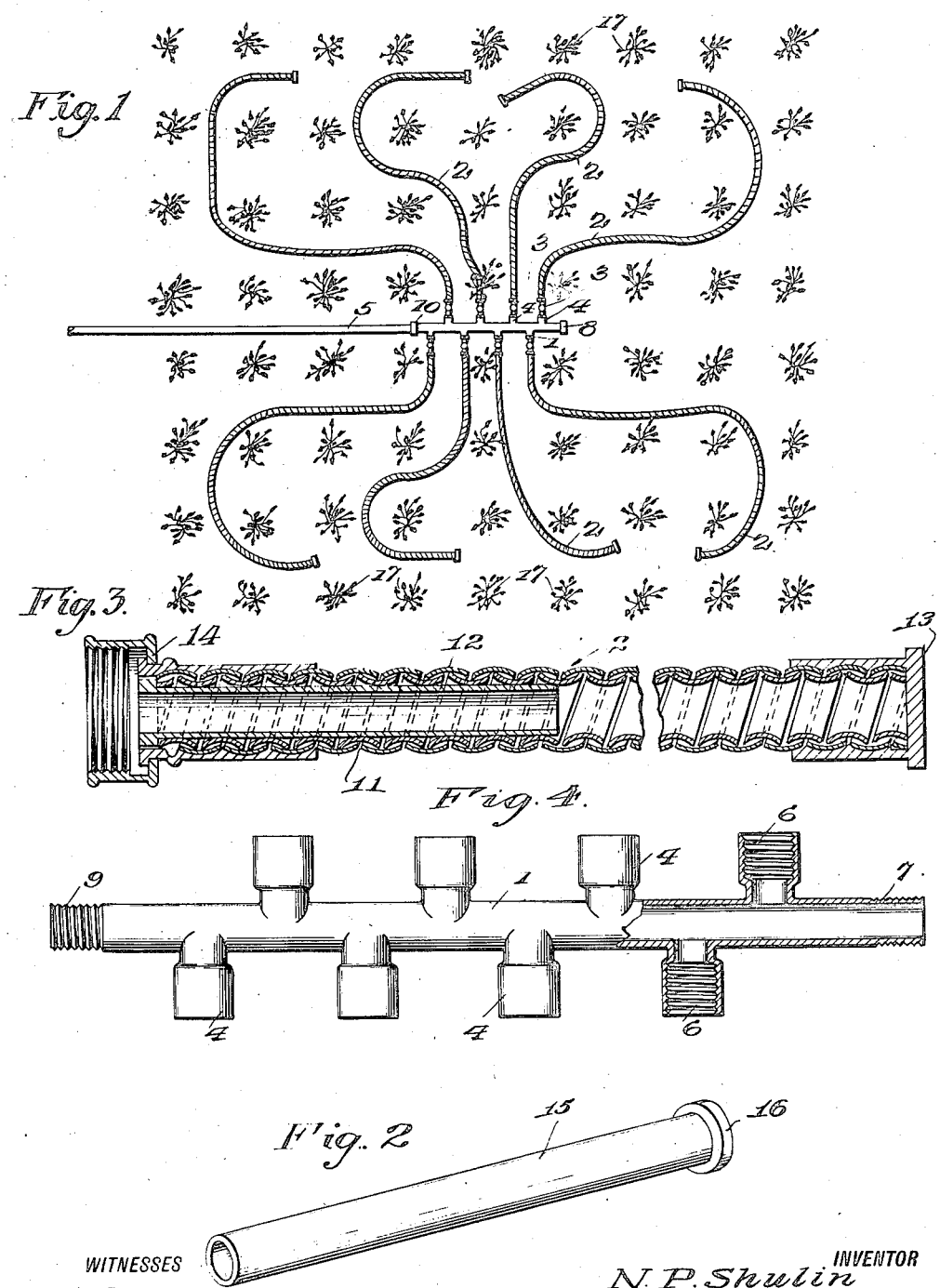
INVENTOR
N. P. Shulin
WITNESSES
BY
ATTORNEYS Patented Feb. 19, 1924.

1,484,575

UNITED STATES PATENT OFFICE.

NEAL P. SHULIN, OF BUTTE, MONTANA.

DISCHARGE MEMBER FOR USE IN IRRIGATING SYSTEMS.

Application filed April 29, 1922. Serial No. 557,291.

*To all whom it may concern:*

Be it known that I, NEAL P. SHULIN, a citizen of the United States, and resident of Butte, in the county of Silver Bow and State of Montana, have invented certain new and useful Improvements in a Discharge Member for Use in Irrigating Systems, of which the following is a specification.

My invention relates to irrigating systems, and it consists in the combinations, constructions and arrangements herein described and claimed.

An object of my invention is to provide a discharge member of simplified construction which will afford facilities for supplying moisture to a relatively large area for a device of a given size.

A further object of my invention is to provide a discharge member of the character described which is particularly well adapted for use in connection with home gardens, flower beds, lawns, and in green houses and the like, and which is adapted for connection with an ordinary water pipe or like source of water supply.

A still further object of my invention is to provide a device of the character described which embodies means for supplying moisture continuously to growing plants in such quantities and in such manner as will insure the moistening of the plants without damaging the same.

Other objects and advantages will be apparent from the following description, and the novel features of the same will be particularly outlined in the appended claim.

My invention is illustrated in the accompanying drawings, forming a part of this application, in which Figure 1 is a plan view showing an embodiment of the invention operatively applied, Figure 2 is a perspective view showing a tubular baffle which is comprised in the device.

Figure 3 is a longitudinal section through the device, and

Figure 4 is a plan view of a distributor conduit which is comprised in the structure exhibited in Fig. 1.

Referring now to the drawings, and particularly to Figure 1 thereof, I show a practical embodiment of the invention in operative position in a garden, flower bed or like place. It will be observed that the apparatus illustrated in Figure 1 comprises a tubular conduit 1, a plurality of delivery conduits 2, valves 3 connecting the delivery conduits with side outlets 4 of the distributor conduit, and a length of pipe, tubing or the like 5 connecting with one end of the distributor conduit 1 and being adapted to establish communication between the distributor conduit 1 and a source of water supply.

The preferred distributor conduit 1 is best seen in Figure 4 and comprises a longitudinal tubular body having a side outlet 4 arranged in spaced relation along the body and opposite sides thereof. Each outlet 4 is formed as an outwardly extending pipe connection threaded interiorly as indicated at 6. Any desirable number of the outlets 4 may be provided for a distributor conduit having a body of a given length. The body of the distributor conduit is threaded externally at one end, as indicated at 7 and a cap 8 is fitted thereon. The body of the distributor conduit is threaded externally at its other end, as indicated at 9 for engagement with a suitable pipe fitting 10 which is employed to connect the body of the distributor to the supply conduit 5.

Each of the delivery or discharge conduits 2 comprises a length of flexible tubing formed of two superimposed series of concentric spiral convolutions of metallic strips 11 and 12 respectively, the strip 11 being fashioned into the inner series of convolutions and the strip 12 being formed into the convolutions wound upon the inner convolutions. The strip 11 is substantially concavo-convex in cross sectional contour while the strip 12 is reversely curved or substantially convexo-concaved in cross sectional contour. The convolutions of each strip are spaced slightly apart and the convolutions of the two strips are arranged in staggered relation so that the side edges of each convolution of the outer strip lie in the concavities or depressed portions of the underlying adjacent convolutions of the strip 11, whereby the convolutions of the two series or strips interlock in such manner as to prevent any appreciable elongation of the flexible tubing formed of these strips while permitting the flexible tubing to be flexed and bent within certain limits. It will be apparent that the flexible tubing comprised of the strips 11 and 12 fashioned in the manner described will be provided with a lateral opening extending spirally of the tubing between the strips 11 and 12 for the entire length of the tubing and that a liquid introduced into the tubing at one end thereof will be permitted to trickle through the lateral spiral opening between the strips 11 and 12 at all points along the length of the tubing. The quantity of the liquid introduced into the flexible tube at one end thereof that will trickle or pass through the lateral spiral opening between the convolutions of the strips in proportion to the quantity that will pass through the flexible tube if both ends thereof are open, will of course be determined partly by the spacing of the convolutions of the strips apart.

The flexible tube comprised in each delivery or discharge conduit 2 is closed at its outer end, as by means of a cap 13. The flexible tube comprised in each delivery or discharge conduit 2 is connected at its inner end by means of a swivel coupling 14 with the outlet of one of the valves 3. The inlet of each of the valves 3 is connected with one of the outlets 4, as hereinbefore stated.

In order to divert the liquid supplied to each discharge nozzle an appreciable distance from the end thereof before permitting any part of the same to pass through the lateral spiral opening of the flexible tubing, I provide a tubular baffle 15 for each delivery or discharge conduit. Each tubular baffle is threaded in the inner end of the flexible tubing of one of the delivery or discharge conduits until a flange 16 at one end of the tubular baffle abuts the inner end of the flexible tubing.

From the foregoing description of the various parts of the device, the operation thereof may be readily understood. The metallic parts of an embodiment of the invention are made of a suitable metal which will not oxidize readily and which therefore will be durable in service. The distributor conduit is operatively connected with a source of liquid supply, as for instance to an ordinary water pipe, and the delivery or discharge conduits are placed upon the ground in adjusted position in respect to growing plants, such as indicated at 17 in Fig. 1. The valves 3 are manipulated to permit desired volumes of water to flow into the delivery or discharge conduit and this supply liquid will trickle through the lateral spiral opening between the convolutions of strips 11 and 12 of the flexible tubing comprised in each delivery or discharge conduit to supply moisture to the plants. It will be apparent that the device will not require attention after having been initially adjusted and that the moisture will be supplied to the land close to the roots so that the moisture delivered will be absorbed by the ground adjacent to the roots of the plants. In the event that it is desired to use a less number of delivery or discharge conduits than the outlets 4, the excess outlets may be closed in any suitable manner, as by means of lugs (not shown).

Obviously, my invention is susceptible of embodiment in forms other than those herein described and illustrated, and I therefore consider as my own, all modifications and adaptations of the forms herein disclosed as fairly fall within the spirit and scope of the appended claim.

I claim:—

In a device of the character described, a discharge member comprising a flexible tubing made of superposed series of concentric spiral convolutions fashioned of two metallic strips, the convolutions of each strip being slightly spaced and the convolutions of the two strips being arranged in staggered relation, means for closing one end of the flexible tubing, means connecting with the flexible tubing at its other end for supplying liquid thereto, and a relatively short tubular baffle inserted in the last named end of the flexible tubing.

NEAL P. SHULIN.